United States Patent [19]

Abe

[11] 4,358,720

[45] Nov. 9, 1982

[54] DC MOTOR DRIVING CIRCUIT

[75] Inventor: Fumiyoshi Abe, Zama, Japan

[73] Assignee: Sony Corporation, Tokyo, Japan

[21] Appl. No.: 235,655

[22] Filed: Feb. 18, 1981

[30] Foreign Application Priority Data

Feb. 25, 1980 [JP] Japan .................................. 55/22606
Feb. 26, 1980 [JP] Japan .................................. 55/23245

[51] Int. Cl.³ .......................................... H02K 29/02
[52] U.S. Cl. ..................................... 318/254; 318/138
[58] Field of Search ............................... 318/138, 254

[56] References Cited

U.S. PATENT DOCUMENTS

4,129,810 12/1978 Harshberger, Jr. ................. 318/317

Primary Examiner—J. V. Truhe
Assistant Examiner—S. M. Bergmann
Attorney, Agent, or Firm—Hill, Van Santen, Steadman, Chiara & Simpson

[57] ABSTRACT

A brush-less dc motor driving circuit is disclosed, wherein a variable constant current source is connected in series with motor windings, and motor torque proportional to motor currents is adjusted by controlling current value of said variable constant current source. Further, a supply voltage control loop is provided, so that power loss at the variable constant current source becomes minimum.

11 Claims, 16 Drawing Figures

DC MOTOR DRIVING CIRCUIT

BACKGROUND OF THE INVENTION

1. Field of the Invention

This invention relates to a motor drive circuit, and particularly to a brushless dc motor control circuit which can linearly control the torque of the brushless dc motor.

2. Description of the Prior Art

Figure 1:
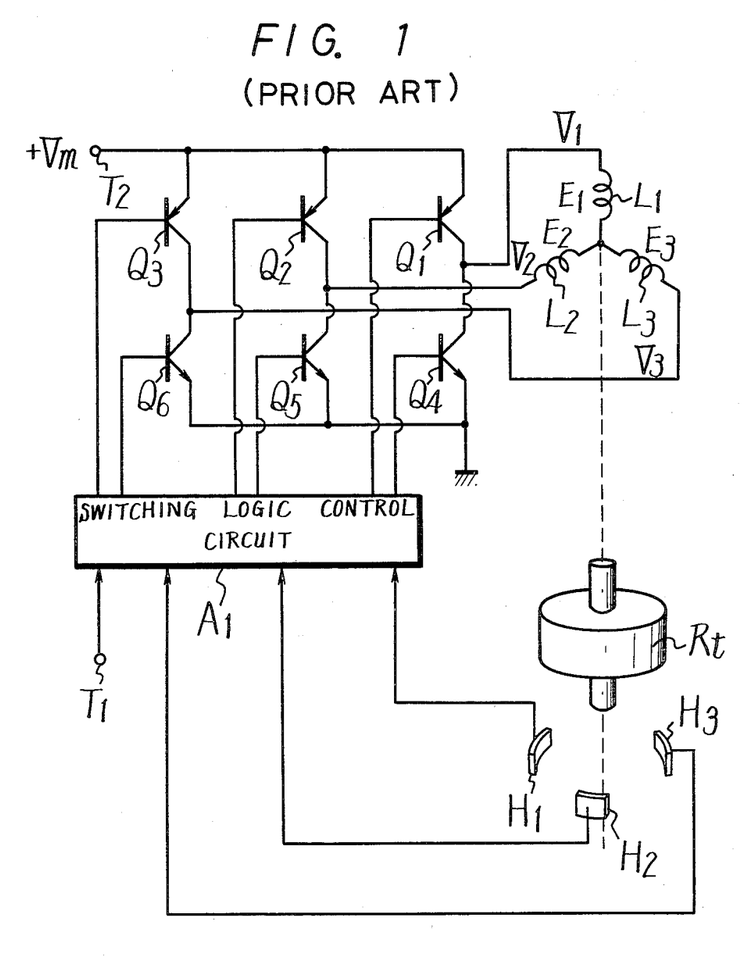
FIG. 1 is a circuit diagram showing a prior art dc brushless motor drive circuit.

A dc brushless motor and its theoretical drive circuit are constructed as shown in FIG. 1.

In FIG. 1, stator windings L1, L2 and L3 of the motor are disposed with an angular interval of 120° between each other. A rotor Rt is made of a permanent magnet, and detecting devices H1, H2 and H3 each consist of, for example, Hall effect device. These devices H1 to H3 are disposed at angular intervals of 120° between each other opposite the rotor Rt to detect a rotating phase of the rotor Rt. The outputs of the devices H1 to H3 are supplied to a switching logic control circuit A1, which performs switching control of output switching transistors Q1 to Q6 in a circle.

Figure 2A:
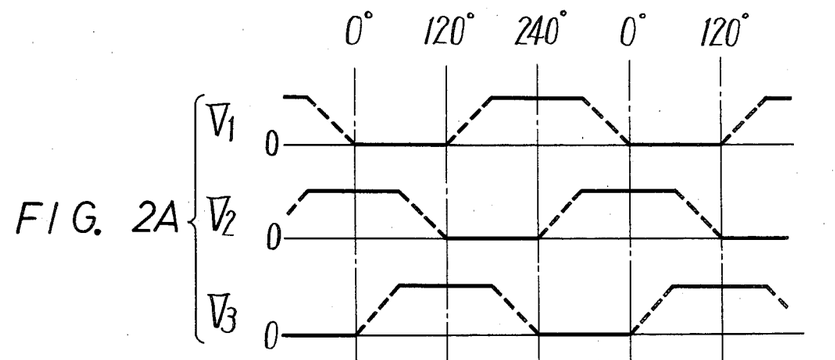
FIGS. 2A and 2B are waveform diagrams used for explaining the above prior art drive circuit.
Figure 2B:
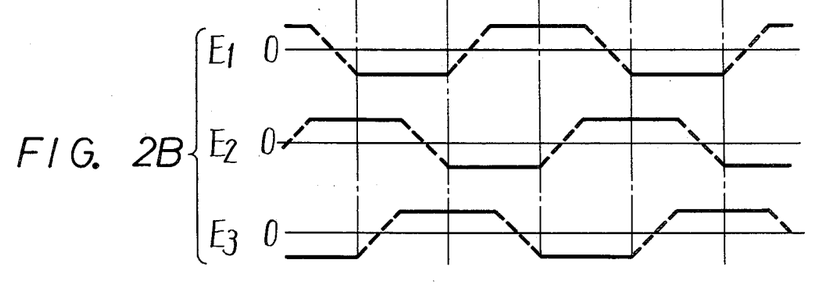

Thus, the windings L1 to L3 are applied with drive pulses V1 to V3 in sequence, as shown in FIG. 2A. The rotor Rt rotates in a forward direction in this case. At this time, the windings L1 to L3 are also generating reverse electromotive voltages E1 to E3 as shown in FIG. 2B. When the logic level at a terminal T1 of the control circuit A1 is changed, the drive pulse V2 is supplied to the winding L3 and the drive pulse V3 is supplied to the winding L2, so that the motor rotates in the reverse or backward direction.

When such a motor as mentioned above is used to carry out any acceleration and deceleration over a wide range of rotation, for example, from 1000 rpm in the forward direction to 1000 rpm in the reverse direction, or when the motor is employed in the reel drive system of a video tape recorder (VTR) to set any tape tension or to carry out the acceleration and deceleration of a tape speed, the torque of the motor must be linearly controlled during braking operation as well as driving operation.

Figure 3:
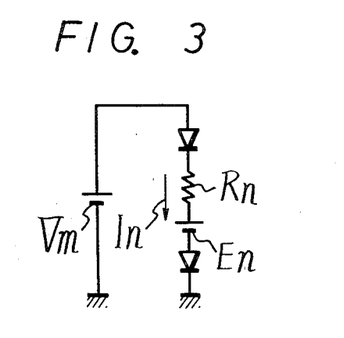
FIGS. 3 and 4 are views showing equivalent circuits of the above drive circuit.
Figure 4:
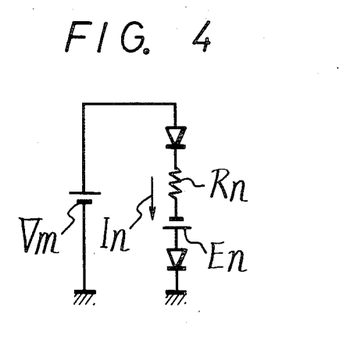

However, in the conventional drive circuit of FIG. 1, the torque can not be controlled to a desired value. In other words, if the transistors Q1 to Q6 are each regarded as a diode because of their unidirectional characteristic, an equivalent circuit during the driving operation is expressed as shown in FIG. 3 and an equivalent circuit during the braking operation is expressed as shown in FIG. 4, where Rn is a resistance of some stator winding, In is a current flowing through the above winding, and Vm is a supply voltage. Accordingly, during the braking operation (FIG. 4), even though Vm=0, the current In flows by the amount of a reverse electromotive voltage En to produce torque corresponding to the current In, so that the torque can not be controlled to a desired value.

SUMMARY OF THE INVENTION

It is a first object of this invention to provide a new dc motor drive circuit.

It is a second object of this invention to provide a novel torque control circuit for a brushless dc motor.

It is a further object of this invention to provide a torque control circuit for a brushless dc motor with less power loss.

According to an aspect of this invention, a variable constant current circuit is connected in series to a brushless dc motor, and motor torque including brake torque is determined by the amount of the current fixed by the above variable constant current circuit.

Further, for dynamic supply of minimum operating bias to the variable constant current circuit which is connected in series to motor windings, a power supply voltage control loop is provided.

As an application example of this invention, there can be given a control circuit of a reel drive motor for a tape recorder and video tape recorder.

The above and other objects, features and advantages of the present invention will be apparent from the following description taken in conjunction with the accompanying drawings.

DETAILED DESCRIPTION OF THE INVENTION

Figure 5:
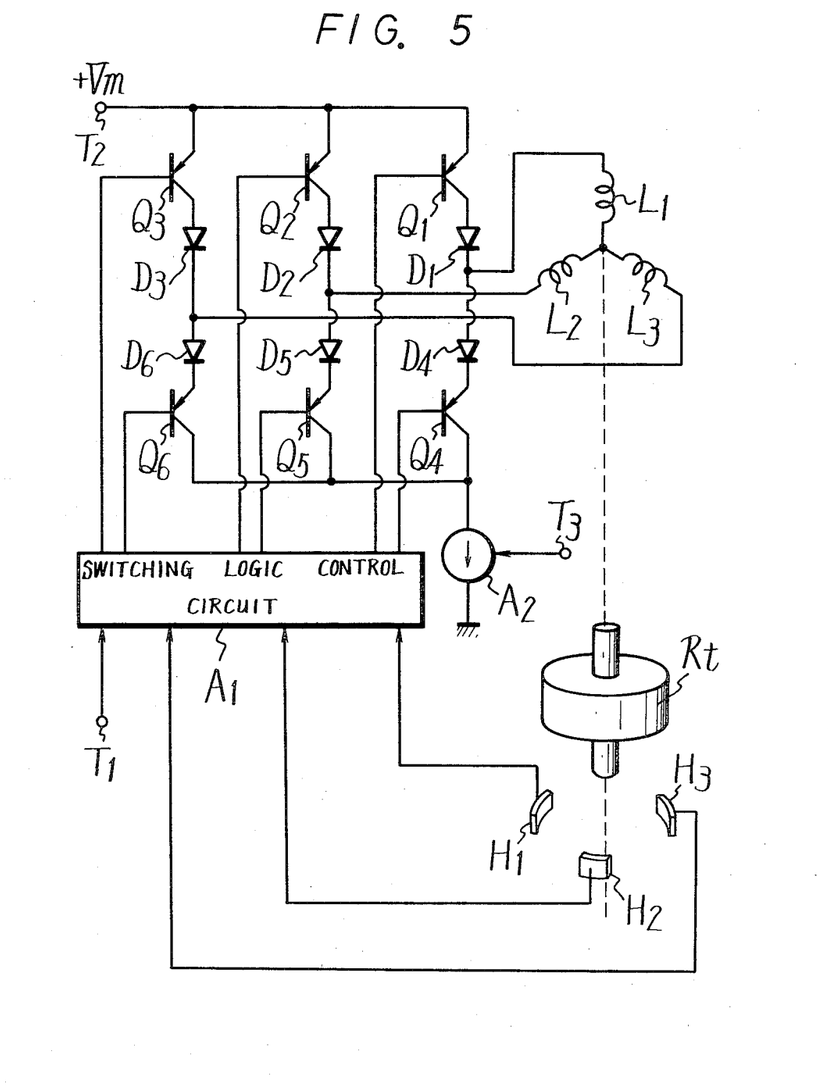
FIG. 5 is a circuit diagram showing one example of a dc motor drive circuit according to this invention.

In the circuit of FIG. 5, between a power supply terminal T2 of dc voltage Vm and the ground, there is connected a series circuit of the emitter-collector path of a transistor Q1, diodes D1 and D4, the emitter-collector path of a transistor Q4, and a variable constant current circuit A2 of a current-sink type. Also, a series circuit is shown of a transistor Q2, diodes D2 and D5, and a transistor Q5, and a series circuit of a transistor Q3, diodes D3 and D6, and a transistor Q6, which are respectively connected in parallel with the series circuit of the transistor Q1, the diodes D1 and D4, and transistor Q4. In addition, among respective connection points of the diodes D1 and D4, D2 and D5, and D3 and D6 are connected stator windings L1, L2 and L3 of the motor. The variable constant current circuit A2 is controlled in its current value by a control signal fed from a terminal T3.

According to the above circuit construction, currents I1 to I3 flowing through the windings L1 to L3 are to be sunk into the constant current circuit A2 in sequence, so that these currents can be controlled by the constant current circuit A2. Accordingly, motor torque can be freely and linearly controlled by changing the constant current circuit A2.

In this case, the diodes D1 to D6 are used for protecting the transistors Q1 to Q6 against respective base-emitter break-down voltages thereof.

Figure 6:
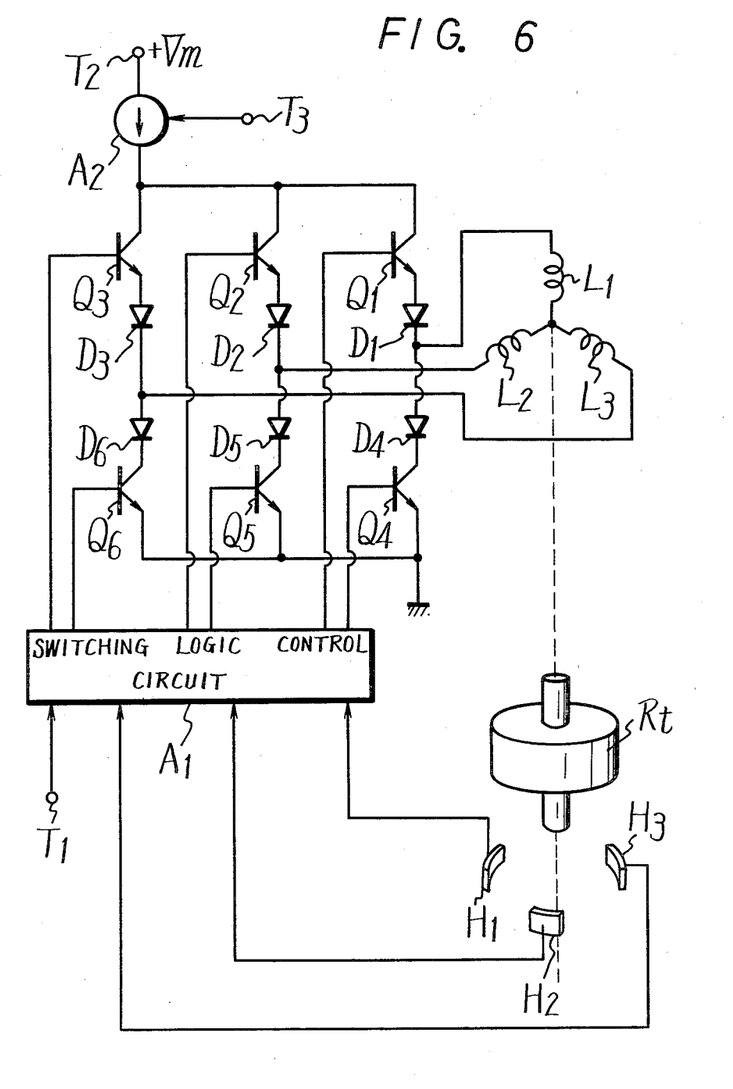
FIGS. 6 to 8, inclusive, are circuit diagrams showing other examples of this invention.

In the example of FIG. 6, the constant current circuit A2 is of a current-source type and is connected to the hot end of the motor windings.

Figure 7:
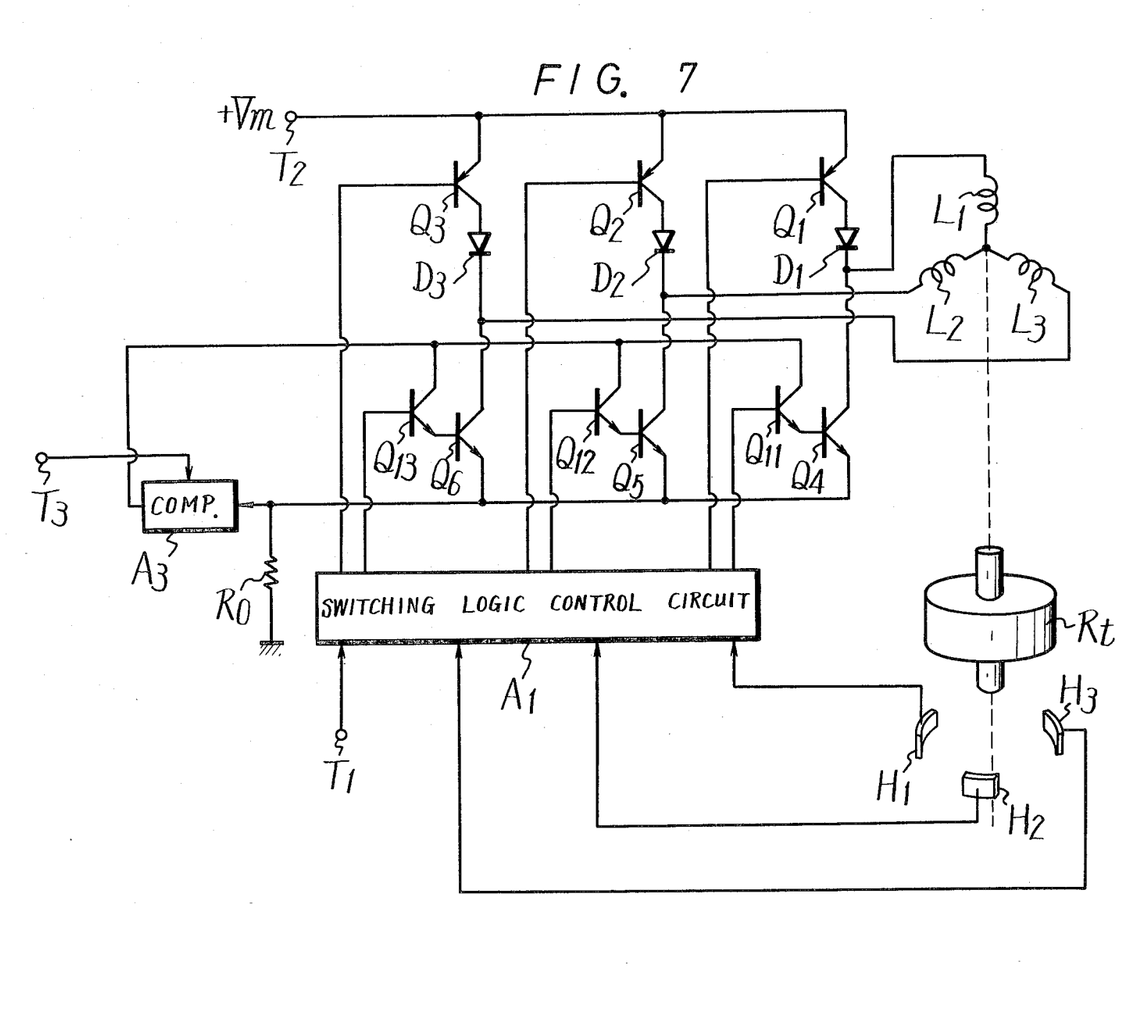

In a circuit of FIG. 7, the transistors Q4 to Q6 are biased to operate in Class A mode, and serve as a switching device as well as a constant current circuit A2. The control circuit A1 functions to control the on-and-off operation of the transistors Q11 to Q13 connected as shown. The motor current In is detected by a resistor Ro and a detected output therefrom is fed to a comparator A3 where it is compared with the control signal from the terminal 3. Then, a compared output of the comparator A3 is supplied through the transistors Q11 to Q13 to the transistors Q4 to Q6 so that the transistors Q4 to Q6 operate in a manner similar to the constant current circuit A2 of FIG. 5.

Thus, according to the above example, since the transistors Q4 to Q6 have the function of a switching device and as well as the constant current circuit A2, the cost of the total circuit can be reduced. Also, each of the transistors Q4 to Q6 operates as the constant current circuit for only one-third of the time period, so that each transistor generates less heat which must be dissipated.

Figure 8:
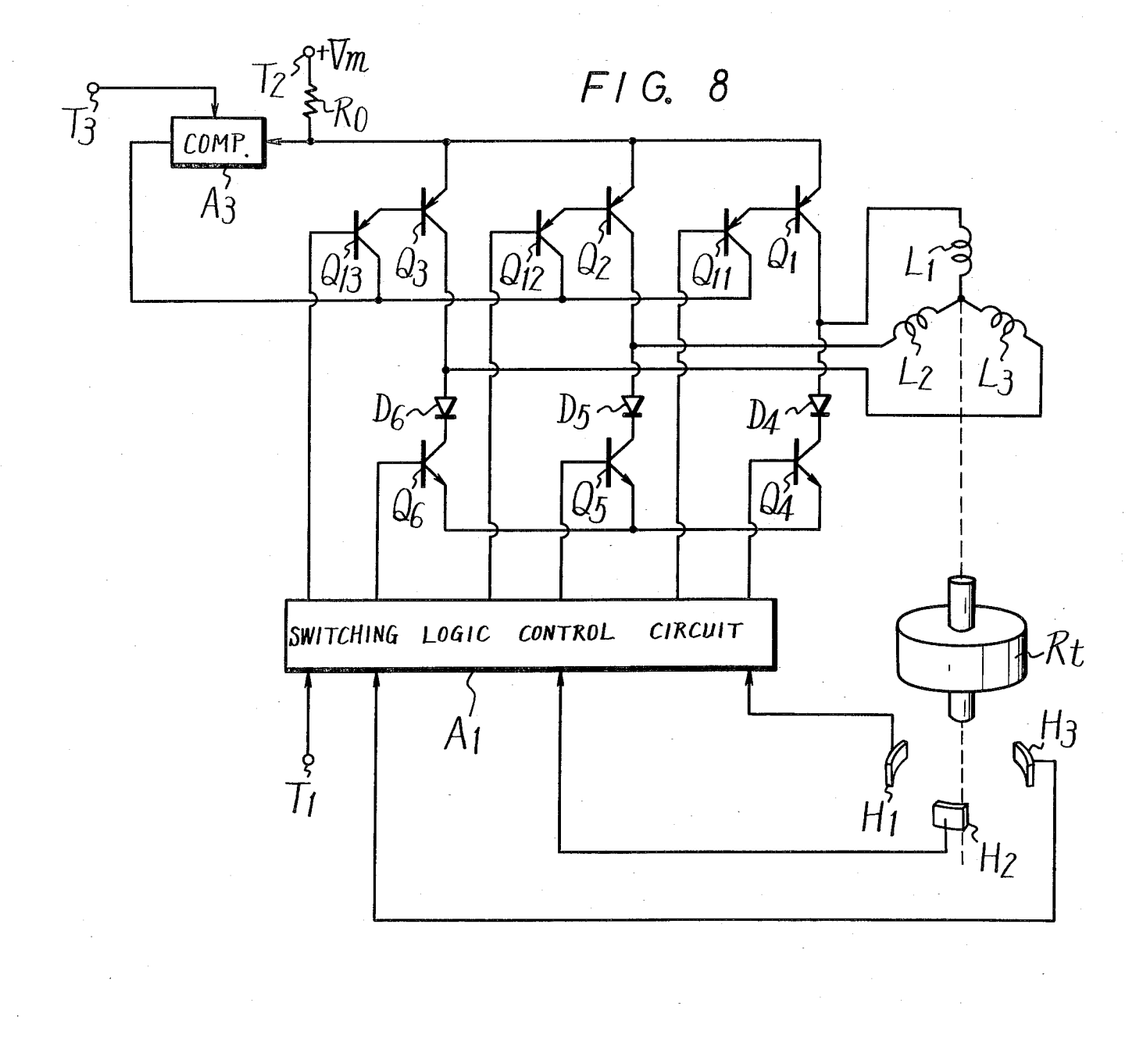

In an example of FIG. 8, the transistors Q1 to Q3 are equivalent to the transistors Q4 to Q6 of FIG. 7, and operate as constant current circuits as well as switching circuits.

Figure 9:
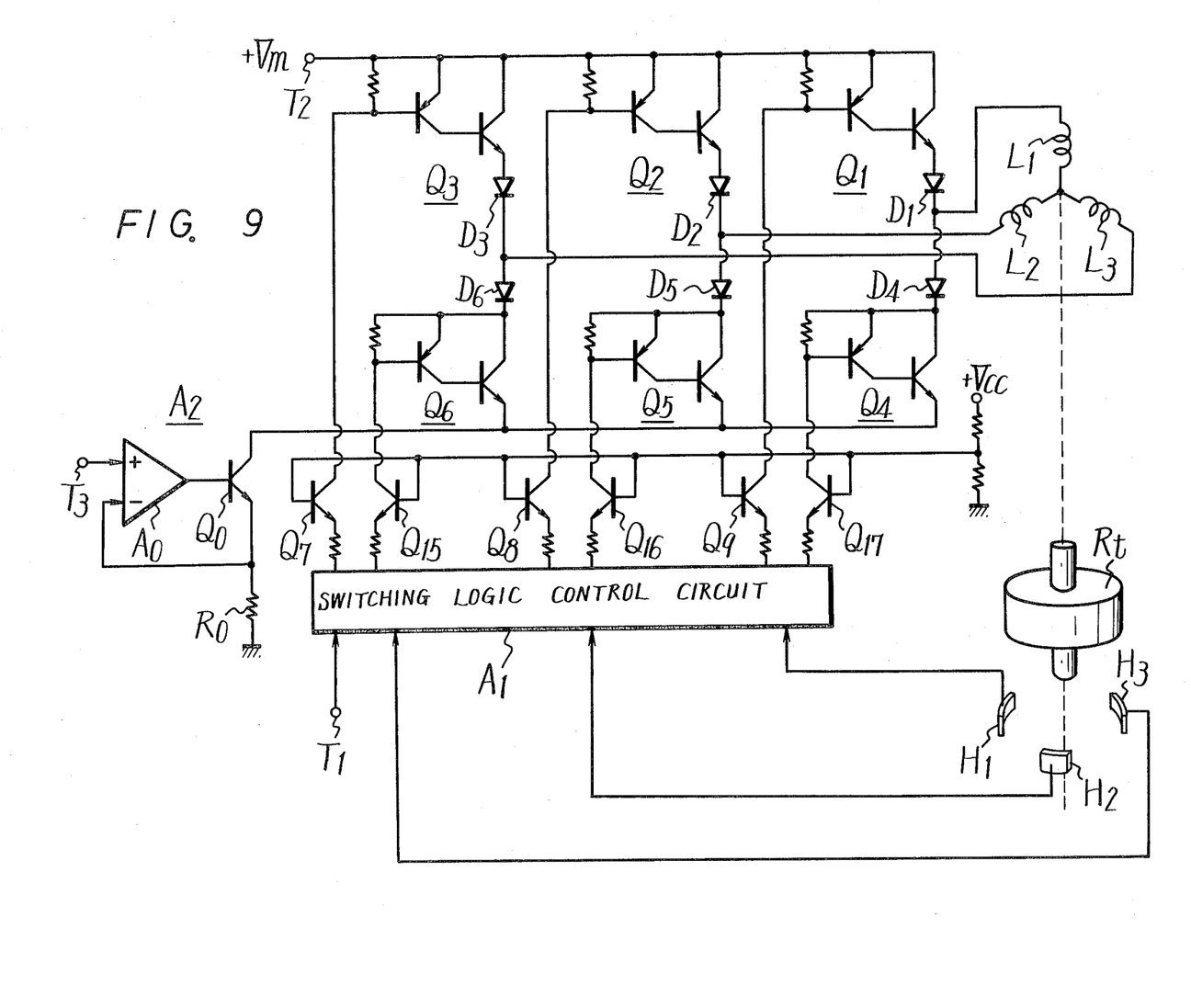
FIGS. 9 and 10 are circuit diagrams showing practical examples of this invention corresponding to the circuits of FIGS. 5 and 7, respectively.

FIG. 9 shows a practical circuit example corresponding to the circuit of FIG. 5. In this circuit, the transistors Q1 to Q6 are each two transistors connected in Darlington manner and the constant current circuit A2 is formed of an operational amplifier Ao, an output transistor Qo and a current detecting resistor Ro. Accordingly, if the control voltage at the terminal T3 is changed, the collector current of the transistor Qo is changed to freely control the motor torque, in accordance with the control voltage.

Transistors Q7 to Q9 and Q15 to Q17 are switching buffer transistors controlled from each emitter side thereof.

Figure 10:
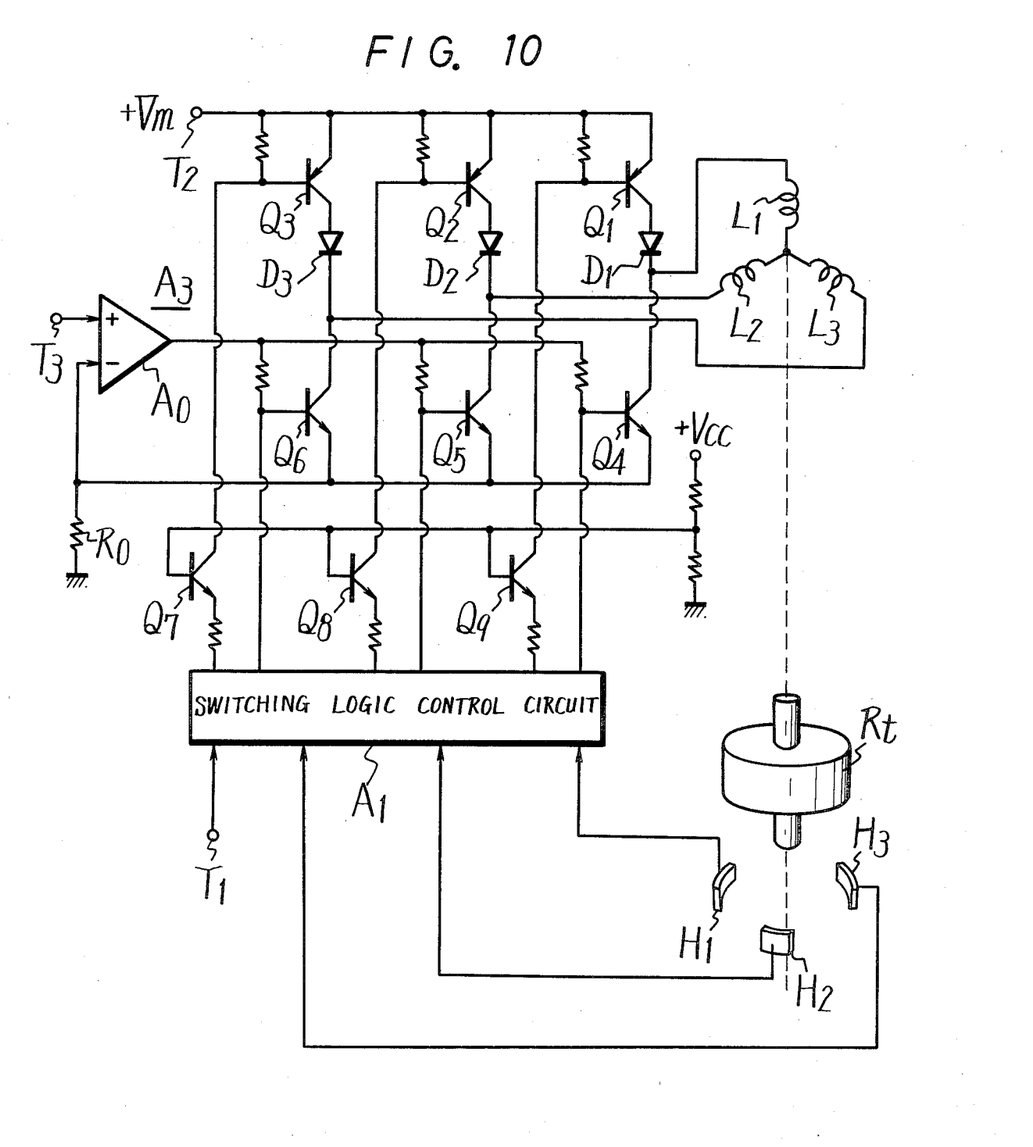

FIG. 10 shows a practical circuit example corresponding to the circuit of FIG. 7. In this circuit, the comparator A3 is formed of the operational amplifier Ao and the current detecting resistor Ro.

Figure 11:
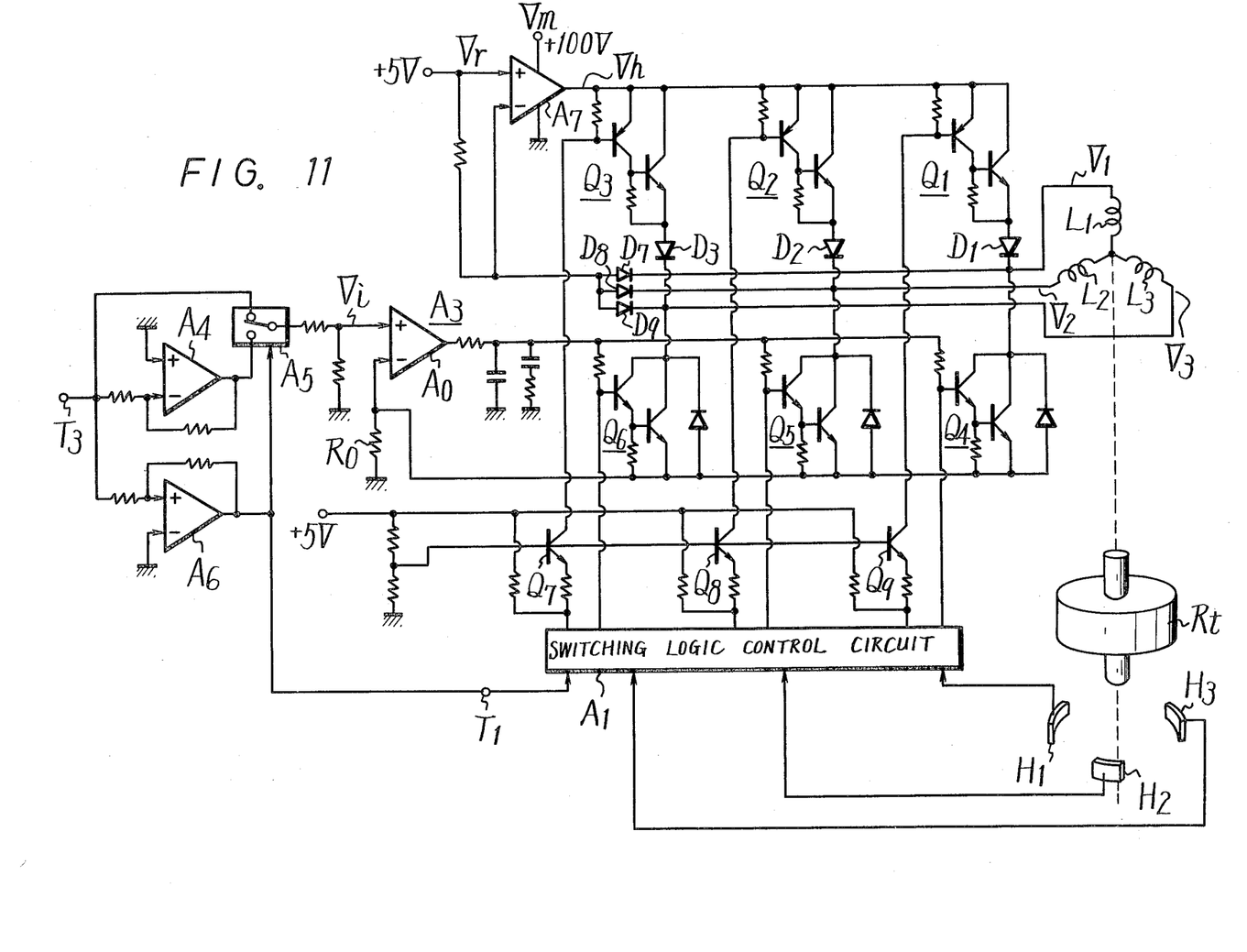
FIG. 11 is a circuit diagram showing a more practical example of a dc motor drive circuit according to this invention.

FIG. 11 shows a more practical circuit example which is actually designed for a reel motor of a VTR. In the example of FIG. 11, dynamic control of a supply voltage to the motor is also carried out. Since the constant current circuit A2 connected in series to the DC motor is arranged to utilize the collector-emitter path of a transistor to generate a constant current, at least a voltage drop of the collector-emitter voltage VcE causes a power loss by an amount of the product of the voltage drop VcE and motor current. In order to hold the above power loss to a minimum value, the circuit of FIG. 11 uses an additional circuit as shown in FIG. 13 or FIG. 14.

Figure 13:
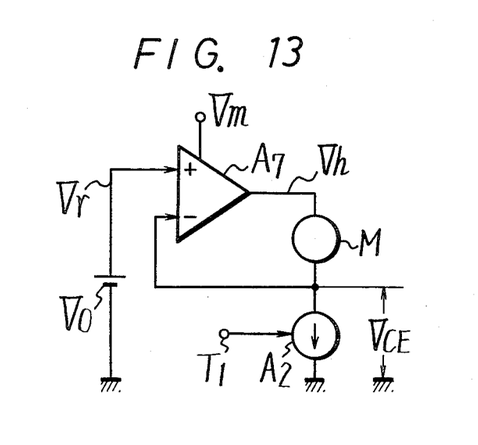
FIGS. 13 and 14 are views showing additional circuits of the drive circuit shown in FIG. 11.

In FIG. 13, an operational amplifier A7 is provided and a reference voltage Vr is fed to this amplifier A7 at its non-inverting input from the voltage source Vo. The motor M and the constant current circuit A2 are connected in series between the output end of the amplifier A7 and the ground, and the connection point between the motor M and the constant current circuit A2 is connected to the inverting input end of the amplifier A7.

According to the construction as mentioned above, a current flowing through the motor M is determined by the constant current circuit A2 and hence the torque of the motor M can be freely controlled by the control voltage applied at terminal T1. In this case, the drop voltage VcE across the constant current circuit A2 is compared with the reference voltage Vr in the operational amplifier A7 and the compared output Vh therefrom is supplied to the motor M so that VcE=Vr is obtained. Accordingly, if the reference voltage Vr can be held to the minimum value required for a constant current transistor to operate, the drop voltage VcE can be made small with the constant current transistor being kept in a normally operating state. As a result, the addition of the above circuit makes it possible to freely control the torque of the DC motor and also to reduce its power loss.

Figure 14:
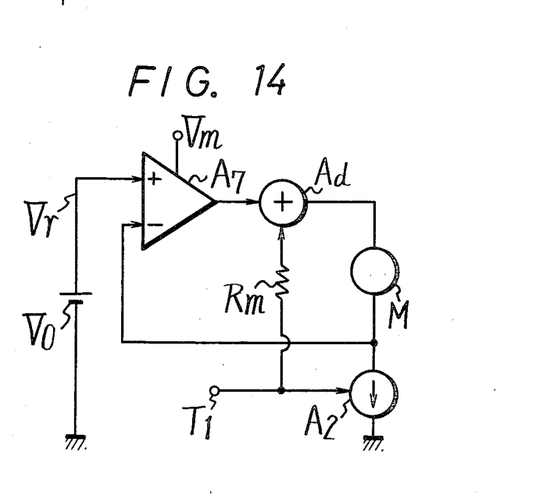

In an example of FIG. 14, an adder Ad is provided between the output end of the operational amplifier A7 and the motor M, and the control voltage from the terminal T1 is applied through a resistor Rm to the adder Ad. The value of the resistor Rm is made equal to the dc resistance of the motor M. Accordingly, in this case, the dc resistance of the motor M is compensated for by the resistor Rm, so that the control voltage from the terminal T1 can widely control the torque of the motor M.

In order to perform the above operation in the circuit of FIG. 11, the operational amplifier A7 is provided and a control loop is formed through diodes D7, D8 and D9 which are connected to windings L1, L2 and L3, respectively. The operating voltages of the transistors Q4 to Q6 are fed back to the operational amplifier A7 and the required minimum voltage is applied to the motor circuit.

Figure 12A:
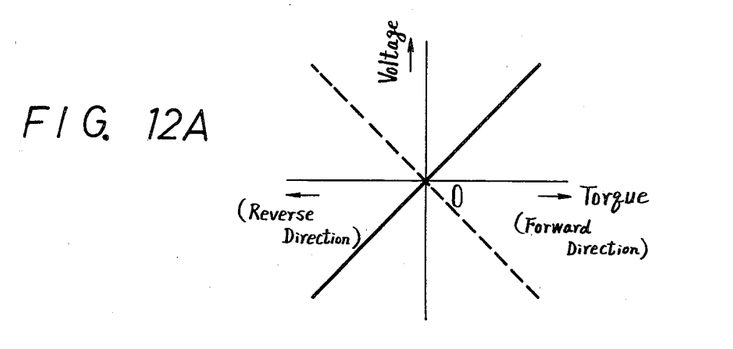
FIGS. 12A, 12B and 12C are views of voltage vs. torque characteristics used for explaining the circuit of FIG. 11.
Figure 12B:
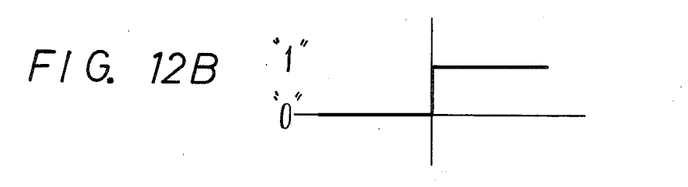
Figure 12C:
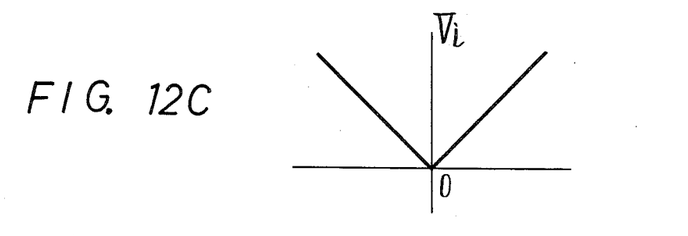

The circuit of FIG. 11 also includes a comparator A6, an operational amplifier A4 and a switching circuit A5 for bidirectional control. That is to say, the terminal T3 is supplied with a control voltage which is varied in polarity and level according to torque to be required as shown in FIG. 12A by a solid line and this control voltage is supplied to the operational amplifier A4 to produce a control voltage which is changed in a complementary manner to the original control voltage as shown in FIG. 12A by a dotted line. These control voltages are supplied to the switch circuit A5. The control voltage from the terminal T3 is also supplied to the comparator A6 where it is converted into a signal which is varied in level according to the direction of torque, as shown in FIG. 12B, and this signal is supplied to the switch circuit A5 as its control signal so that a dc voltage having a level corresponding to the absolute value of torque as shown in FIG. 12C is derived from the switch circuit A5. This dc voltage is supplied to the operational amplifier A3 for the motor torque control.

The output voltage of the comparator A6 is also supplied to the terminal T1 as a signal for controlling the direction of rotation.

Further, the operational amplifier A7 performs control of the motor drive voltage described in FIG. 12 to obtain a motor torque drive circuit with high efficiency.

It will be apparent to those skilled in the art that many modifications and variations may be effected without departing from the spirit and scope of the novel concepts of the present invention.

I claim as my invention:

1. A dc motor drive circuit for controlling torque of a dc motor comprising:
   a power supply terminal;
   a reference voltage terminal; a plurality of switching circuits,
   a plurality of windings for said motor interconnected by said switching circuits between said power supply terminal and said reference voltage terminal for supplying driving power to said windings; and
   a variable constant current circuit connected in circuit with said motor windings and said first power supply terminal and said reference voltage terminal and said variable constant current circuit controlling the torque of said dc motor in response to a control signal supplied to said variable constant current circuit.

2. A dc motor drive circuit as set forth in claim 1, which further comprises:
   a detecting circuit connected to said variable constant current circuit for detecting voltage drops across said constant current circuit; and
   a power supply control circuit connected to said detecting circuit for regulating the supply voltage between said first and second power supply terminals to a predetermined value.

3. A dc motor drive circuit as set forth in claim 1, wherein said dc motor is a brushless motor which includes a plurality of windings and position detectors, and in which said plurality of switching circuits receive outputs from said position detectors for driving said dc motor in the forward and reverse directions.

4. A dc motor drive circuit as set forth in claim 3, wherein each of said switching circuits includes a pair of switching devices connected in series, and each of said motor windings connected to a junction point between said series-connected switching devices.

5. A dc motor drive circuit as set forth in claim 4, in which one of said switching devices included in each set of switching circuits is biased to operate as said variable constant current circuit.

6. A dc motor drive circuit as set forth in claim 5, which further comprises:
   a detecting circuit connected to said junction point for detecting voltage drops across said one of switching devices; and
   a power supply control circuit connected to said detecting circuit for regulating the supply voltage between said first power suppy terminal and said reference voltage terminal to a predetermined value.

7. A torque control circuit for a brushless dc motor driving circuit comprising, a power supply terminal, a control signal terminal, a plurality of series circuits each of which includes a first transistor, first and second diodes and a second transistor serially connected between said power supply terminal and a variable constant current circuit, a dc motor having a plurality of stator windings, each of said stator windings being respectively connected to the connection point of said first connected diodes of said series circuits, a constant current circuit controlled in its current value by a control signal fed from said control signal terminal.

8. A torque control circuit for a brushless dc motor driving circuit comprising, a power supply terminal, a control signal terminal, a plurality of series circuits each of which includes a first transistor, first and second diodes and a second transistor serially connected between said power supply terminal and a variable constant current circuit, a dc motor having three stator windings, each of said stator windings being respectively connected to the connection point of said first connected diodes of said series circuits, a constant current circuit controlled in its current value by a control signal fed from said control signal terminal.

9. A torque control circuit according to claim 8 wherein said each of first transistors comprise a pair of transistors connected in Darlington manner.

10. A torque control circuit according to claim 8 wherein each of said second transistors comprise a pair of transistors connected in Darlington manner.

11. A torque control circuit according to claim 8 including three additional diodes (D7, D8, D9) connected respectively between a reference voltage source and to said connection point of said first connected diodes of said series circuits with said stator windings.

* * * * *